COUPLING DEVICE FOR CASCADED TRANSISTOR AMPLIFIERS

Filed April 1, 1968 2 Sheets-Sheet 1

INVENTORS
JACOBUS J. RONGEN
THEODOOR G.F. HERMENS
BY
AGENT

COUPLING DEVICE FOR CASCADED TRANSISTOR AMPLIFIERS

Filed April 1, 1968 2 Sheets-Sheet 2

INVENTORS
JACOBUS J. RONGEN
THEODOOR G.F. HERMENS
BY
AGENT

United States Patent Office 3,497,821
Patented Feb. 24, 1970

3,497,821

COUPLING DEVICE FOR CASCADED TRANSISTOR AMPLIFIERS

Jacobus Johannes Rongen and Theodoor George Frederik Hermens, Nijmegen, Netherlands, assignors, by mesne assignments, to U.S. Philips Corporation, New York, N.Y., a corporation of Delaware Filed Apr. 1, 1968, Ser. No. 717,797
Claims priority, application Netherlands, Apr. 8, 1967, 6705024
Int. Cl. H03f 3/42
U.S. Cl. 330—19 4 Claims

ABSTRACT OF THE DISCLOSURE

A coupling element for cascaded transistor amplifiers. The coupling element is an auxiliary transistor having the base-emitter path shunted by a resistor of a smaller impedance than the base-emitter resistance of the auxiliary transistor and having the collector thereof connected directly to a power supply common to the auxiliary and input transistor.

The invention relates to a device which comprises a first and a second transistor and in which an output electrode, in particular the collector, of the first transistor is connected to an input electrode, in particular the base, of the second transistor through a coupling element having a considerably higher direct current resistance than alternating current resistance. In known devices of this type, for example, a Zener diode is used as the coupling element, so that the comparatively high direct voltage at the collector of the first transistor is reduced to the comparatively low direct voltage at the base of the second transistor without this being detrimental to the alternating voltage which is generated at the collector of the first transistor. In integrated circuit technology it is becoming common parctice to use, instead of such a Zener diode, the series arrangement of a number of diodes polarized in the forward direction as the coupling element, the internal threshold voltage of which diodes again results in a direct voltage jump from the collector of the first transistor to the base of the second, while nevertheless the full alternating voltage signal at the collector of the first transistor becomes available at the base of the second transistor.

For temperature compensation purposes it is known per se to replace such a series arrangement of rectifiers polarized in the forward direction by an auxiliary transistor the collector-emitter path of which is shunted by a potentiometer, the part of which located between the base and the emitter has an impedance which is small relative to the base input resistance of the auxiliary transistor. If this replacement of the series arrangement of a number of diodes which is known for a different purpose were used as the coupling element in the above described amplifier, this would give unsatisfactory results as will become apparent from the following.

The invention is characterized in that the coupling element consists of the series arrangement of two resistors the second of which is shunted by the base-emitter path of an auxiliary transistor, while the resistance value of said second resistor is smaller than the internal base-input resistance of the said auxiliary transistor, the collector of the auxiliary transistor being so connected to a supply terminal that the collector current of the auxiliary transistor bypasses an impedance connected in the circuit of the said output electrode of the first transistor.

In order that the invention may be readily carried into effect, it will now be described in greater detail, by way of example, with reference to the accompanying drawings, in which FIGURE 1 shows the principle circuit diagram according to the invention.

Figure 1:
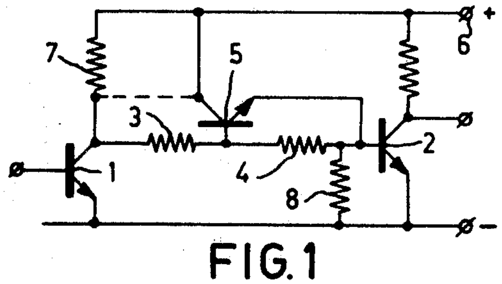

FIGURE 1 is a simplified form of the circuit diagram of an amplifier as it can be realized in integrated circuit technology on a single semiconductor element. The amplifier comprises a first transistor 1 and a second transistor 2 which are arranged in cascade by means of a coupling element comprising the circuit element 3, 4 and 5; said coupling elements connects the collector of the transistor 1 to the base of the transistor 2 and has a considerably higher direct current resistance than alternating current resistance.

According to the invention said coupling element consists of the series arrangement of two resistors 3 and 4, the resistor 4 being shunted by the base-emitter path of an auxiliary transistor 5, while the resistance value of resistor 4 is smaller than the internal base input resistance of said auxiliary transistor. Assuming that the collector of the transistor 5 is not connected to the supply terminal 6, as is shown by the solid line, but that it would be connected to the collector of the transistor 1, as is shown by the broken line, the coupling element 3, 4, 5, operates as follows:

Assuming $V_0$ to be the internal emitter-base threshold voltage of the transistor 5 (that is the voltage above which the voltage at the transmitter 5 applied externally between the base and the emitter must rise in order to make said transistor conductive), the direct voltage drop across the resistor 4 will adjust at a value $nV_0$, where $n$ is the relationship between the sum of the resistors 3 and 4 to the resistor 4 alone. Actually, as soon as said voltage tends to rise above the value $nV_0$, the voltage across said resistor will tend to rise above the value $V_0$, due to the above-mentioned proportioning condition for the resistor 4, which results in the transistor 5 becoming conductive and a current flowing through the collector resistor or impedance 7 of the transistor 1 and through the base input of the transistor 2, respectively, which current produces a higher voltage drop across the said impedance 7 and at said base, respectively, and thus tends to counteract the above-assumed voltage rise. Between the collector of the transistor 1 and the base of the transistor 2, a direct voltage drop is thus produced which is substantially equal to $nV_0$, while nevertheless alternating voltages at the collector of the transistor 1 produce such current variations in the transistor 5 that said alternating voltages are produced substantially unattenuated at the base of the transistor 2.

However, the drawback of the broken-line connection is that the direct current of the auxiliary transistor 5 fully flows through the resistor 7. Since the current through the transistor 5 must be sufficiently large to make its alternating current resistance sufficiently small, said current may constitute too large a direct current load for the collector resistor 7 of the transistor 1, so that the driving range of transistor 1 is reduced. In order to avoid this, the collector of the transistor 5 is connected according to the invention, to the supply terminal 6 in such manner that its current bypasses the collector resistor or impedance 7 of the transistor 1. When again the voltage across the resistors 3, 4 rises above the value $nV_0$, a current will flow through the transistor 5 which, it is true, no longer results in an (undesired) voltage drop across the resistor or impedance 7, but does result in a voltage variation at the base of the transistor 2, in that sense that said rise of the voltage across the resistors 3, 4 above the value $nV_0$ is counteracted. This means that the alternating voltage at the collector of the transistor 1 is substantially entirely transmitted to the base of the transistor 2 without, however, constituting a direct current load for the collector circuit of the transistor 1.

In order to reach that the extra direct current does not flow fully through the base of the transistor 2, an additional resistor 8 may be connected between the base and the emitter of said transistor.

Figure 2:
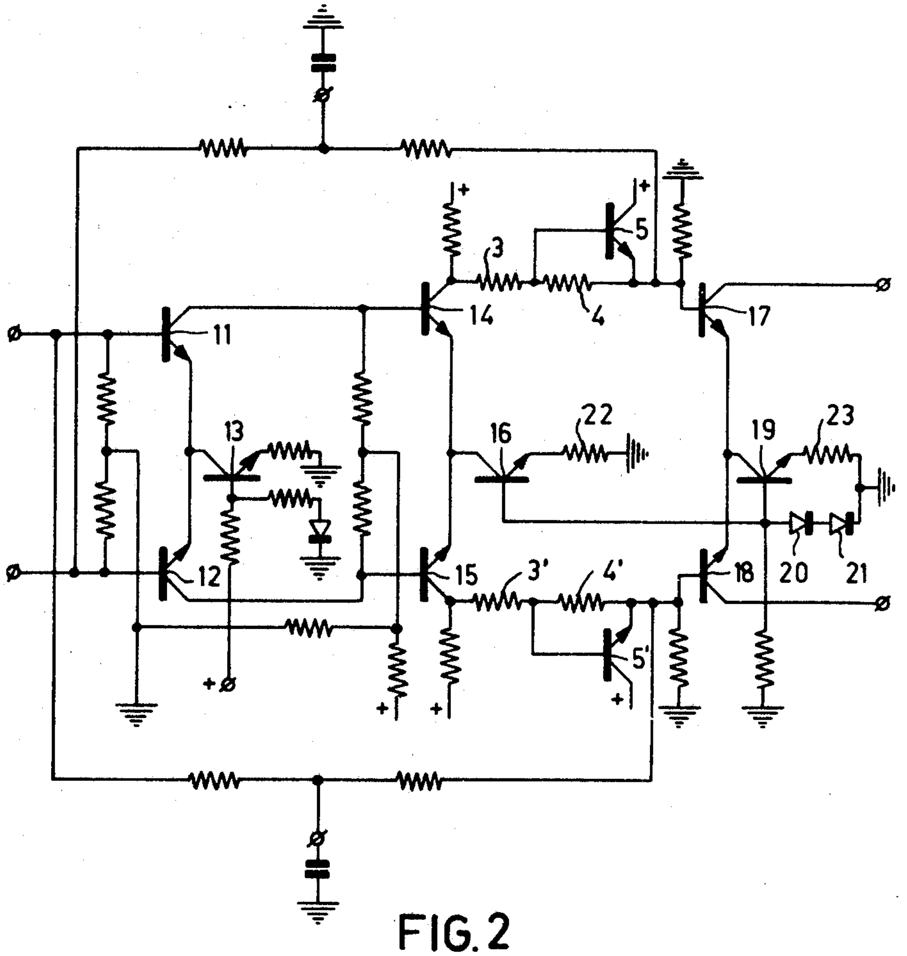
FIGURE 2 shows a further elaborate embodiment according to the invention

In the embodiment shown in FIGURE 2, an input signal, for example, the intermediate frequency signal of the sound channel of a television receiver, is applied to a push-pull stage 14, 15, through a pseudo push-pull amplifier 11, 12 having the transistor 13 in the emitter line. In the common emitter line of the push-pull amplifier 11, 12, the transistor 13 is connected as a high ohmic alternating current resistor having a low direct voltage drop. Likewise, the transistor 16 is connected as a high alternating current resistor having a low direct current resistance in the common emitter line of the push-pull amplifier 14, 15. The coupling with the output push-pull amplifier 17, 18 having a transistor 19 connected in the same manner as the transistor 16 in the common emitter line is obtained by the elements 3, 4, 5 and 3', 4', 5', respectively, connected in accordance with FIGURE 1. The diodes 20 and 21 ensure that the bases of the transistors 16 and 19 obtain the correct direct voltage level. The emitter resistors 22 and 23 serve to increase the internal collector resistances of said transistors.

The first and the second transistor and the coupling element may be integrated in a common semiconductor body, the circuit elements being provided in the surface regions, termed islands, of one conductivity type which are embedded in part of the opposite conductivity type of the semiconductor body. The two series-arranged resistors and the auxiliary transistor of the coupling element may simply be provided in the same island.

Figure 3:
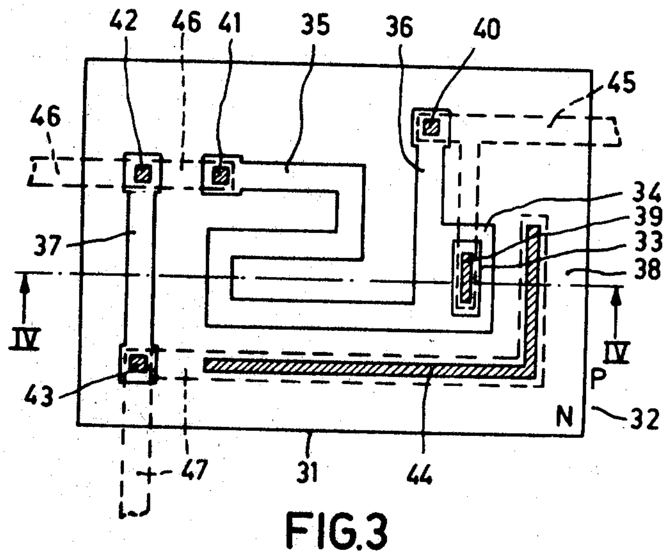
FIGURES 3 and 4 show the construction of the integrated circuit.

FIGURE 3 diagrammatically shows a plan view of such an island 1 in which the coupling element is provided.

Figure 4:
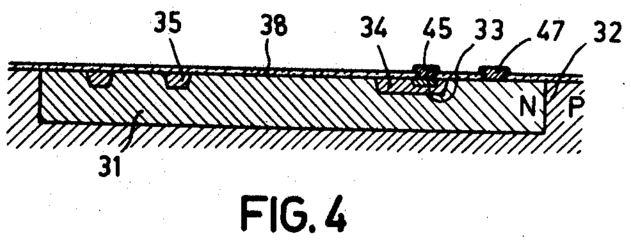

FIGURE 4 diagrammatically shows a cross-sectional view of the island 1 taken on the line IV—IV in FIGURE 3.

The island 31 is, for example, of the n-type conductivity and is embedded in a p-type part 32, not shown, of the semiconductor body.

The auxiliary transistor 5 in FIGURE 1 comprises an n-type emitter region 33 and a p-type base region 34. The part of the n-type island 31 surrounding the base region 34 constitutes the collector region of the auxiliary transistor 5.

The series-arranged resistors consist of the p-type regions 35 and 36.

In the present embodiment the two series-arranged resistors 3 and 4, respectively, of FIGURE 1 consist of surface regions 35 and 36, respectively, of the opposite conductivity type (p-type) which adjoin the base region 34 so that the base region 34 with the resistor 35 and 36 constitutes one region 34, 35 and 36 of the opposite conductivity type. In this manner a particularly simple and efficacious structure of the coupling element is obtained. The low value of the resistor 4 in FIGURE 1 results in the resistor 36 which, spatially, can easily be provided within the island 31 while in addition comparatively little space is required for the zig-zag-shaped resistor 35, corresponding to the resistor 3. Such a structure is extremely suitable for all those cases in which a coupling element behaving as a Zener diode is desired.

Furthermore, in the present embodiment the impedance 7 connected in the collector circuit of the first transistor 1 is provided in the same island 31 as a surface region 37.

In a manner commonly used in semiconductor technology the island 31 is covered with an insulating layer 38, for example, of silicon oxide. In FIGURE 3, the insulating layer 38 is deemed to be transparent so that the underlying regions are visible. These regions may be attained in a manner commonly used in semiconductor technology by means of photoresist methods and diffusion treatments.

Conductive tracks, shown in broken lines and consisting, for example, of aluminum layers, are provided on the insulating layer 38 and are connected to regions in the semiconductor body through apertures in the insulating layer which are shown shaded in FIGURE 3.

The conductive track 45 connects the emitter region 33 to the resistor 36 through the apertures 39 and 40. This track 45 is also connected to the base of the second transistor which is not shown and which is located in a different island.

The track 46 connects the resistor 35 to the impedance 37 through the apertures 41 and 42. In addition this track constitutes the connection to the collector region of the first transistor which is not shown and is likewise located in a different island.

The track 47 connects the impedance 37 to the collector region 31 of the auxiliary transistor 5, through the apertures 43 and 44. This track may furthermore be connected to a supply terminal.

What is claimed is:

1. A cascaded amplifier having an input terminal and an output terminal, comprising a first transistor having input, output and common terminals, means connecting the input terminal of the first transistor to the input terminal of the amplifier, a first impedance, means for connecting the output terminal of the first transistor to a first reference voltage through the first impedance, a second transistor having input, output and common terminals, means for connecting the output terminal of the second transistor to the output terminal of the amplifier, a second impedance, means for connecting the input terminal of the second transistor to a second reference voltage different from the first reference voltage through the second impedance, and a coupling element comprising an auxiliary transistor having input, output and common terminals, means for connecting the output terminal of the auxiliary transistor directly to a reference source different from the second reference source, means for connecting the common terminal of the auxiliary transistor to the input terminal of the second transistor, a third impedance, means for connecting said third impedance to the output terminal of the first transistor, a fourth impedance having an impedance value less than the input to common terminal impedance of the auxiliary transistor, means for connecting the fourth impedance intermediate the second impedance and the input terminal of the second transistor, means for connecting the third impedance to the fourth impedance, and means for connecting the input terminal of the auxiliary transistor intermediate the third and fourth impedances.

2. A device as claimed in claim 1, wherein the first and the second transistor and the coupling element are integrated in a common semiconductor body, the circuit elements being provided in surface regions, termed islands, of one conductivity type which are embedded in a part of the opposite conductivity type of the semiconductor body, the third and fourth impedances and the auxiliary transistor of the coupling element being provided in the same island.

3. A device as claimed in claim 2, wherein the third and fourth impedances consist of surface regions of the opposite conductivity type embedded in the same island as the auxiliary transistor and adjoining the base region of the auxiliary transistor so that said base region with the resistors constitutes one region of the opposite conductivity type.

4. A device as claimed in claim 3, wherein the first impedance connected in the collector circuit of the first transistor and the coupling element are provided in the same island.

References Cited

UNITED STATES PATENTS 3,323,071 5/1967 Mitchell ............ 330—38

ROY LAKE, Primary Examiner

JAMES B. MULLINS, Assistant Examiner

U.S. Cl. X.R.

330—38, 22